United States Patent
Golden et al.

(10) Patent No.: US 7,188,064 B2
(45) Date of Patent: Mar. 6, 2007

(54) SYSTEM AND METHOD FOR AUTOMATIC SEMANTIC CODING OF FREE RESPONSE DATA USING HIDDEN MARKOV MODEL METHODOLOGY

(75) Inventors: Richard M. Golden, Plano, TX (US); Michael Arthur Durbin, Richardson, TX (US); Jason Warner Earwood, Irving, TX (US)

(73) Assignee: University of Texas System Board of Regents, Austin, TX (US)

( * ) Notice: Subject to any disclaimer, the term of this patent is extended or adjusted under 35 U.S.C. 154(b) by 721 days.

(21) Appl. No.: 10/122,713

(22) Filed: Apr. 12, 2002

(65) Prior Publication Data

US 2003/0018470 A1    Jan. 23, 2003

Related U.S. Application Data

(60) Provisional application No. 60/283,744, filed on Apr. 13, 2001.

(51) Int. Cl.
*G10L 15/14* (2006.01)

(52) U.S. Cl. .................................. 704/256.2

(58) Field of Classification Search .................. 704/9, 704/10, 256.2
See application file for complete search history.

(56) References Cited

U.S. PATENT DOCUMENTS 5,642,522 A * 6/1997 Zaenen et al. ............... 715/532
5,897,616 A * 4/1999 Kanevsky et al. ............ 704/246
5,930,746 A * 7/1999 Ting ................................ 704/9
6,363,348 B1 * 3/2002 Besling et al. ............. 704/270.1
6,393,389 B1 * 5/2002 Chanod et al. ................. 704/7
6,418,403 B2 * 7/2002 Fuji ................................ 704/10

OTHER PUBLICATIONS

Jian et al, "Grammatical Category Disambiguation Based on Second-Order Hidden Markov Model", Systems, Man, and Cybernetics, 2001, pp. 887-891, vol. 2.*

J. Earwood, "Autocoder: An Intelligent Assistant for Coding Protocol Data," Senior Honors Thesis in Psychology, School of Human Development, University of Texas at Dallas, Richardson, TX, 2000.

D. Freitag and A. McCallum, "Information Extraction with HMMs and Shrinkage," *AAAI-99, Workshop on Machine Learning for Information Extraction*, 1999.

T. R. Leek, "Information Extraction Using Hidden Markov Models," Masters Thesis, Electrical Engineering and Computer Science Department, U.C. San Diego, 1997.

(Continued)

*Primary Examiner*—Michael N. Opsasnick
(74) *Attorney, Agent, or Firm*—Jenkens & Gilchrist, P.C.

(57) ABSTRACT

A system and method for coding text data wherein a first group of text data is coded using a Viterbi algorithm using a Hidden Markov model. The Hidden Markov Model computes a probable coding responsive to the first group of text data. A second group of text data is coded using the Viterbi algorithm using a corrected Hidden Markov Model. The Hidden Markov Model is based upon the coding of the first group of text data. Coding the first group of text data includes assigning word concepts to groups of at least one word in the first group of text data and assigning propositions to groups of the assigned word concepts.

46 Claims, 5 Drawing Sheets

OTHER PUBLICATIONS

I. Muslea, "Extraction Patterns for Information Extraction Tasks: A Survey," *AAAI-99. Workshop on Machine Learning for Information Extraction*, 1999.

K. Seymore, A. McCallum and R. Rosenfeld, "Learning Hidden Markov Model Structure for Information Extraction," *AAAI-99, Workshop on Machine Learning for Information Extraction*, 1999.

A. Stolcke, E. Shriberg, et al. "Dialog Act Modeling for Conversational Speech," *Applying Machine Learning to Discourse Processing, 1998 AAAI Spring Symposium*, No. SS-98-01, 98-105, Menlo Park, CA, *AAAI Press*, 1998.

J. P. Yamron, I. Carp, L. Gillick, S. Lowe and P. van Mulbregt. "A Hidden Markov Model Approach to Test Segmentation and Event Tracking," *Proceedings ICASSP-98*, Seattle, May 1998.

Allen, J., *natural Language Understanding*, The Benjamin/Cummings Publishing Company, Inc., Redwood City, CA, 1995.

P. van Mulbregt, I Carp, L. Gillick, S. Lowe and J. P. Yamron, "Text Segmentation and Topic Tracking on Broadcast News Via a Hidden Markov Model Approach," *Proceedings ICSLP-98*, Sydney, Dec. 1998.

D. D. Palmer, J. D. Burger and Mari Ostendorf, "Information Extraction from Broadcast News Speech Data" (The MITRE Corporation, Boston University).

* cited by examiner

SYSTEM AND METHOD FOR AUTOMATIC SEMANTIC CODING OF FREE RESPONSE DATA USING HIDDEN MARKOV MODEL METHODOLOGY

RELATED APPLICATION(S)

This Application claims priority from and incorporates herein by reference the entire disclosure of U.S. Provisional Application Ser. No. 60/283,744 filed Apr. 13, 2001.

TECHNICAL FIELD

The present invention relates to information extraction technology, and more particularly, for a method for determining a general meaning of text using a Hidden Markov Model.

BACKGROUND OF THE INVENTION

Information extraction (IE) technology has received increasing amounts of attention over the past several years. In contrast to information retrieval (IR) technology which is concerned with the problem of automated document retrieval, IE technology is concerned with the problem of automated information retrieval. IE technology also differs fundamentally from the problem of solving the full-blown natural language understanding problem. The general natural language understanding problem is concerned with developing computer systems which have a "deep" understanding of a text. In contrast, IE technology is not concerned with the problem of trying to understand all information conveyed in a text. IE technology is concerned with simply attaining a "partial understanding" of a text for the purpose of extracting specific information. IE technology can be applied in a range of situations (e.g., as an advance technology technique for searching the web and e-mail, to assist the performance of speech recognition systems and language translation, automatic extraction of information from bus schedules, automatic extraction of information regarding a particular disease from medical documents, grading student exam essays, etc.).

Theories and experiments in the field of text comprehension have often required mapping recall, summarization, talk aloud, and question-answering protocol data into a semantic model of the implicit and explicit information in text clauses. This semantic model of the information in the text clauses has been referred to as the text based microstructure. Typically, this initial coding procedure of mapping the protocol data into a text based microstructure is done using human coders. Inter-coder reliability measures are then used to establish the reliability of the coding procedure.

This widely used coding procedure methodology, however, has several problems. First, the coding procedures are typically not well documented. Second, the reliability of the procedures is often highly dependent upon "human coders", who despite their best intentions, are prone to inconsistent coding behaviors (especially over very large coding tasks). Third, such coding procedures are typically not readily accessible to other researchers. And fourth, coding procedures across research labs located in different parts of the world are not standardized in any particular fashion.

An ideal solution to these problems would be to develop an automated approach to coding human protocol data. Although important progress in this area has been made, additional work is required. It should be emphasized that the task of coding human protocol data is not nearly as complex as the full-fledged natural language understanding problem. Consider a typical experiment where a group of human subjects are asked to recall the same story from memory. Although the resulting protocol data will be extremely rich and varied, typically the text comprehension researcher is only interested in detecting a relatively small number of propositions. This dramatically simplifies the pattern recognition problem. Thus, there is needed a new theoretical framework for worldwide remapping human protocol data into a text based microstructure.

SUMMARY OF THE INVENTION

A system and method for coding text data wherein a graphical user interface enables a human coder to code a first group of text data. A Hidden Markov Model is generated responsive to the coded first group of text data, and a Viterbi (or Sampling algorithm) responsive to the generated Hidden Markov Model is used to code a second group of text data.

DETAILED DESCRIPTION

Figure 1:
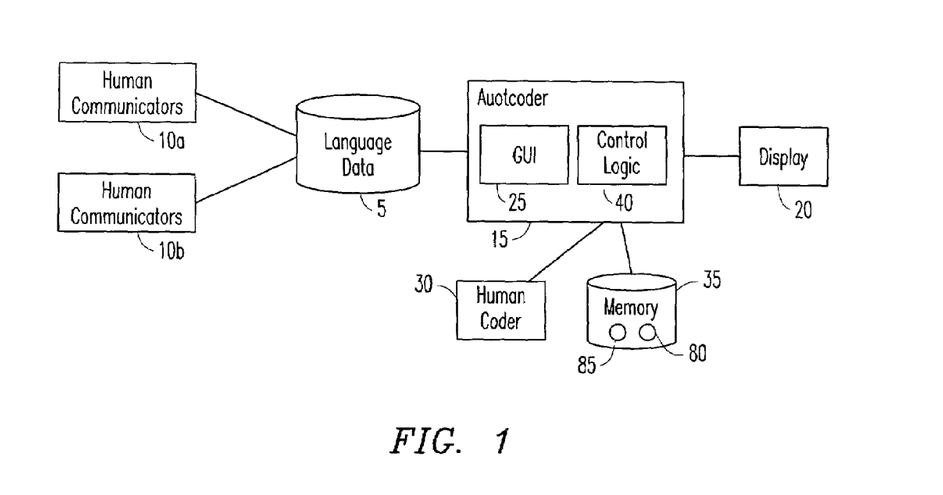
FIG. 1 illustrates a functional block diagram of the system of the present invention.

Referring now to the drawings, and more particularly to FIG. 1, wherein there is illustrated a block diagram of the system of the present invention, language data 5 from a set of human communicators 10 is collected for the purposes of teaching an autocoder 15. The language data 5 from the human communicators 10 is displayed upon a display 20 using a graphical user-interface (GUI) 25. Using the graphical user-interface 25, a human coder 30 identifies key concepts, as will be more fully described in a moment, used by a human communicator 10 by indicating word sequences in the human communicator's language data 5 referring to a particular concept. Human coder 30 also uses the graphical user-interface 25 to identify which key concept correspond to propositions which the human communicator is intending to convey. The autocoder 15 collects statistics based upon the human coder's decisions and stores information within a memory 35. The autocoder 15 includes control logic 40 which uses the statistics to make optimally informed decisions about how to code the language data 5 produced by subsequent communicators 10b. The autocoder 15 allows the human coder 30 to correct any errors that it made coding the language data 5 of the subsequent human communicator 10b. These corrections are incorporated by the control logic 40 into the statistical information stored within memory 35. This process repeats until the training process is complete and the autocoder 15 error rate is sufficiently small.

Figure 2:
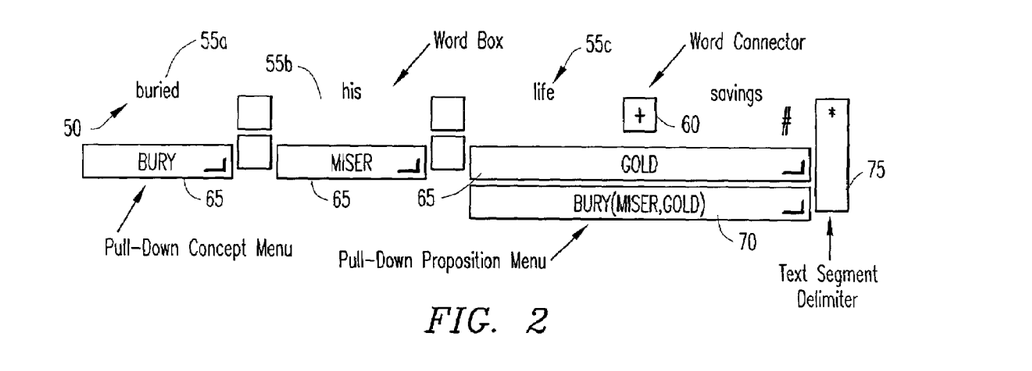
FIG. 2 is an illustration of a graphical user-interface for performing the coding process of the present invention.

Referring now also to FIG. 2, there is illustrated a typical autocoder 15 display on the graphical user-interface 25. A human communicator's language data 5 is displayed in a first line 50 of the graphical user-interface 25. During the coding or correction phase, the human coder 30 segments the text phrase so that each word sequence in each text segment corresponds to a proposition. The language data 5 is divided up into separate word boxes 55 each including a word or a group of words relating to a single concept. In the case of word box 55C, the word "life" and "savings" are both included and connected by word connector 60. The language data 5 included within line 50 comprises the phrase "buried his life savings". The word "buried" and "his" are each included in separate word boxes 55A and 55B respectively. Various concepts within the text paragraph are separated by a fixed segment delimiter 75. Text segment delimiters 75 are used to show relations between various text concepts having separate propositions associated with them via the pull down proposition menu 70.

Beneath each word box 55 is a pull down concept menu 65. The concept menu 65 comprises a pull down menu consisting of a series of concepts. The human coder 30 decides which word or word sequences should be assigned to a concept and uses the concept pull down menu 65 to assign a concept to each selected word within a given text segment. A pull down proposition menu 70 also displayed on the GUI 25 includes a list of available propositions which can be assigned to a word or phrase. The pull down proposition menu 70 enables the assignment of a proposition to a given sequence of concepts within that segment. The concept menu 65 and proposition menu 70 also enable the addition of new concepts and propositions by a human coder 30. Menu choices are made by a human coder 30 for the purposes of providing training data for Hidden Markov Models. Hidden Markov Models are used to automatically make "most probable" menu selections without the aid of a human coder 30 through the use of the Viterbi algorithm for HMMs or a specialized Sampling Algorithm.

Figure 3:
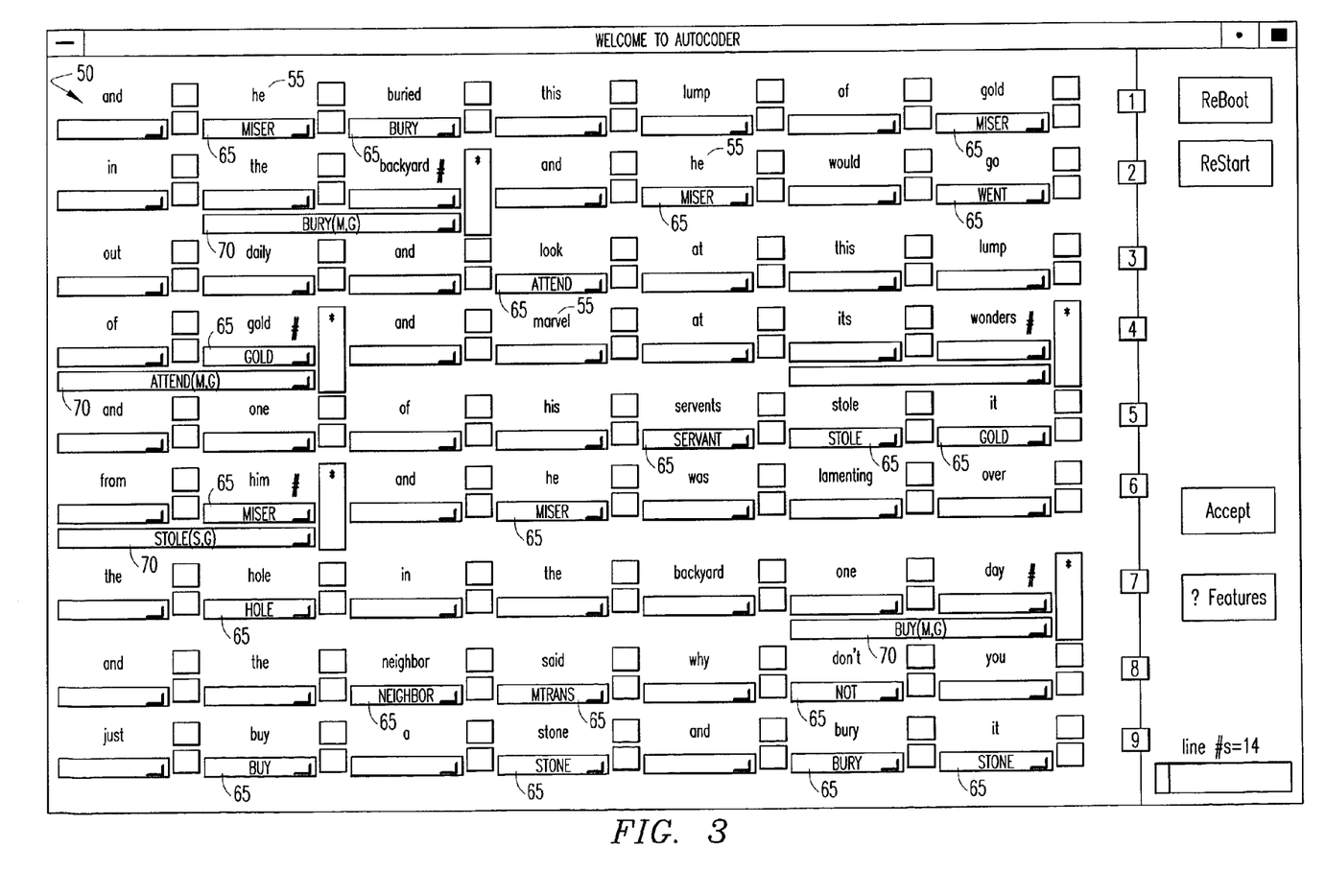
FIG. 3 illustrates the manner in which various concepts and propositions may be associated with text.

Referring now also to FIG. 3, there is shown a use of the graphical user-interface 25 to code an entire text. As can be seen, each word or group of words in the text is associated with a particular word box 55. Words in a word box 55 considered to be significant have concepts associated with them by the pull down concept menu 65. It should be noted that not all words within a segment will always have a concept associated with them. Some words are not necessary in order to determine a general meaning to a particular group of text.

Referring now back to FIG. 1, the control logic 40 controls the manner in which the provided concepts and propositions are processed in order to first establish the parameters of a Hidden Markov Model associated with a particular proposition. Further, it uses the Viterbi algorithm (or a Sampling Algorithm) and the Hidden Markov Model to process a newly provided group of text and thereby assign a proposition and concepts.

For the assigned data, it is assumed that sequence $W_1, \ldots, W_M$ comprises an ordered sequence of words (or word phrases) within a particular text segment which a human coder 30 has decided should be an assigned proposition F. The notation $C_i$, denotes a concept assigned to the ith word $W_i$. F comprises a proposition assigned to the concept sequence $C_1, \ldots, C_M$. After the human coder 30 has completed the coding task, the control logic 40 and the autocoder 15 generate the following items responsive to the input of the human coder 30. A concept dictionary 80 consists of the concepts created by the human coder 30. A proposition dictionary 85 includes the propositions coded by the human coder 30. A number of parameters are also created for use in the Hidden Markov Model. These parameters include the percentage of times that a particular proposition F has been used (denoted by p(F)), the percentage of times that a word (or a word phrase) $W_i$ is used to express the concept $C_i$ (denoted by $p(W_i|C_i)$) is computed (this is referred to as the "emission probability" in the HMM literature), and the percentage of times that one concept follows another concept given a particular proposition F (denoted by $p(C_{i+1}|C_i, F)$) (this is referred to as the "transition probability" in the HMM literature). Given the usual conditional independence assumptions of a Hidden Markov Model, these parameters in conjunction with the concept dictionary 80 and proposition dictionary 85 correspond to a particular type of probabilistic theory of how a human coder 30 codes the language data 5.

For example, consider the text segment "he buried his life savings deeply in the ground". The human coder might choose to model this text segment as an ordered sequence of word phrases: ($W_1$="He", $W_2$="buried", *, $W_3$="life savings", *, *, *, *) might be associated with the ordered sequence of concepts: ($C_1$="MISER", $C_2$="BURY", *, $C_3$="GOLD", *, *, *, *) where the * is used to refer to a word (or word phrase) which is not assigned a concept for the purpose of coding the protocol data. The proposition equals F="BURY(MISER, GOLD)" would be assigned to the concept sequence ($C_1$="MISER", $C_2$="BURY", *, $C_3$="GOLD ", *, *, *, *).

Once the assignments have been made, statistics are computed. Specifically, the probability that one concept follows another given a particular proposition (e.g., P(BURY|MISER, BURY(MISER,GOLD)) is estimated from the observed relative frequencies. In addition, the probability of a word given a concept is estimated (e.g., P("life savings"|GOLD)) The probability that a given proposition is used is also estimated from the coder's behavior (e.g., P(BURY(MISER,GOLD)). Instead of assigning a zero probability to transition and emission probabilities whose corresponding observed relative frequencies were equal to zero, a small "smoothing" probability is used to facilitate processing of novel word sequences.

Figure 4:
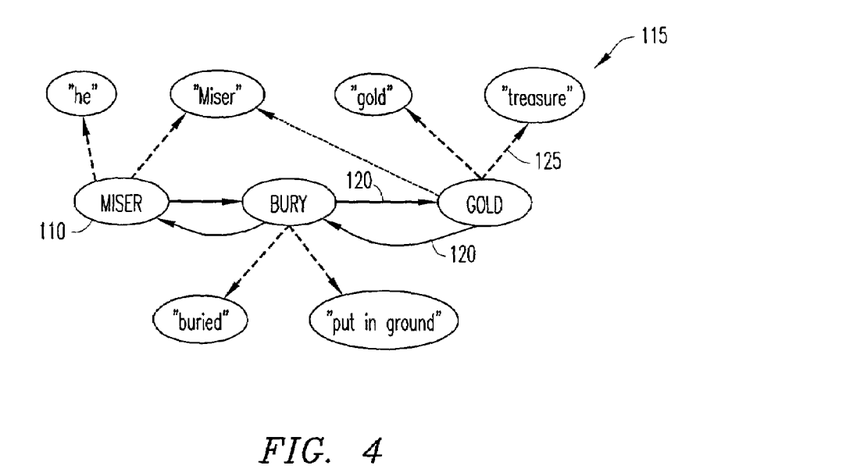
FIG. 4 illustrates an example of a Hidden Markov Model for a composition according to the present invention.

FIG. 4 shows a possible HMM representation for the proposition BURY(MISER,GOLD). Each proposition 110 is represented by its own Hidden Markov Model 115. Hidden Markov Model 115 for the proposition BURY(MISER, GOLD) is graphically displayed in FIG. 4. Transition probabilities 120 are represented by solid arrows while emission probabilities 125 are represented by dashed arrows. Line thickness indicates the relative magnitude of the corresponding transition or emission probability. Thus, line thickness for the emission probability P(Word="gold"|Concept=GOLD) and transition probability P(Concept=GOLD|Concept=BURY, Proposition=BURY (MISER, GOLD)) are both much thicker than line thickness for the emission probability P(Word="Miser"|Concept=GOLD) and transition probability P(Concept=BURY|Concept=GOLD, Proposition=BURY (MISER, GOLD)).

Once the Hidden Markov Model has been generated, a Viterbi algorithm is used to construct the "most probable" concept sequence associated with each possible proposition for a particular text segment. The "information content" in bits (i.e., a normalized log-likelihood measure) I, a proposition F consisting of M concepts $C_1, C_2, \ldots, C_M$ and represented by M word phrases $W_1, \ldots, W_M$ is computed using the formula:

$$I = -(1/M)\log\left[p(F)\prod_{i=1}^{M} p(C_{i-1}, F)p(W_i \mid C_i)\right]$$

where log [x] denotes the logarithm base 2.

Next, the proposition which is "most probable" (i.e., has the smallest information content score I) is selected. Propositions whose information content exceeds some maximum critical value are discarded and those text segments are defined as "incomprehensible" to the autocoder 15. This threshold is set sufficiently high, however, so that the occurrence of "incomprehensible" propositions is very rare. It should be noted that unlike the usual Hidden Markov Model approach to syntactic and semantic parsing, a unique Hidden Markov Model is constructed for each proposition rather than trying to construct a general Hidden Markov Model applicable to all possible propositions which could occur in the text.

Figure 5:
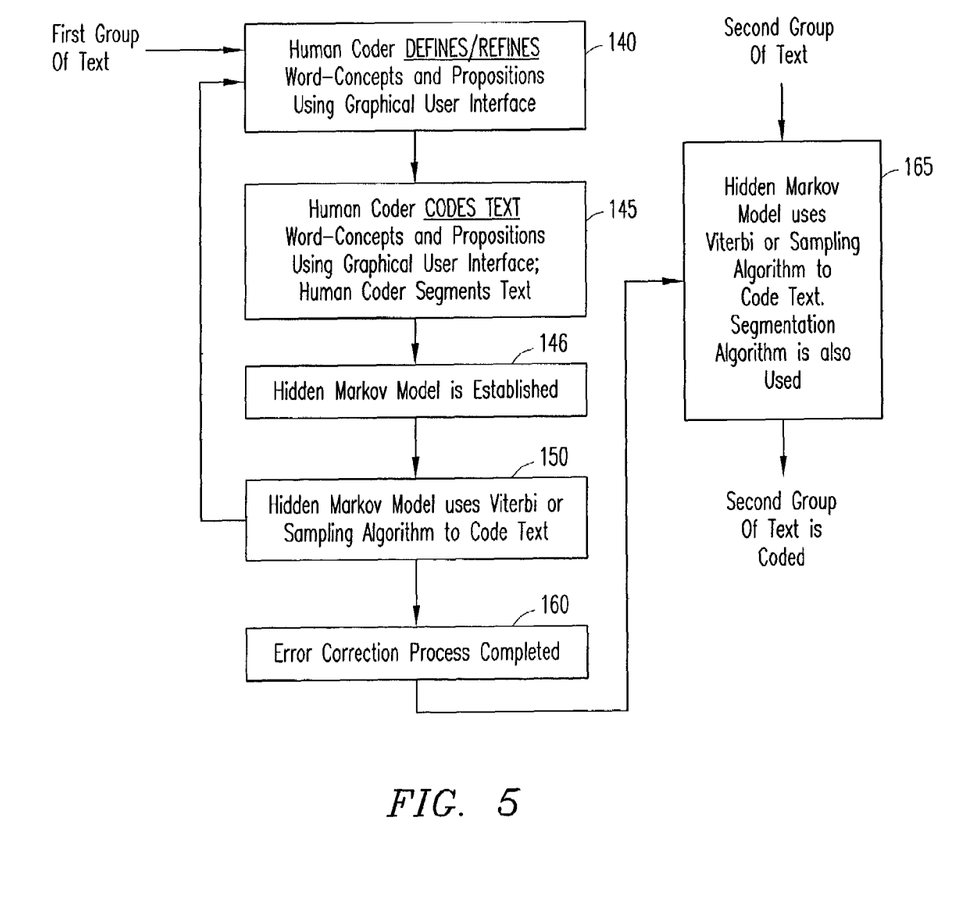
FIG. 5 is a flow diagram illustrating the manner in which language data may be encoded using an autocoder.

Referring now to FIG. 5, there is illustrated below a diagram illustrating the overall methodology the auto coder 15 is first taught and later used to semantically annotate text with word concepts and propositions. A human coder defines and refines word concepts and propositions for a first group of text using a graphical user interface at step 140. The human coder next segments and codes the text using the word concepts and propositions at step 145 via the graphical user-interface. Parameters are established by the autocoder responsive to the provided coding by the human coder and a Hidden Markov Model is established from the parameters at step 146. The first group of text data is then coded by the autocoder using a Viterbi algorithm or a Sampling Algorithm (described with respect of FIG. 7) relying upon the established Hidden Markov Model at step 150. The coding involves assigning highly probably word-concepts and propositions. The provided coding results may be corrected by the human coder at step 140 and the corrections used to update the Hidden Markov Model at step 146. Control returns to step 140 to process the text data such that the autocoder will again have its Hidden Markov Model updated until such a point as only minor or no corrections are necessary to the Hidden Markov Model. Once this iterative process has been completed at step 160, the trained Hidden Markov Model is used to code a second group of text data using the Viterbi algorithm (or the Sampling Algorithm described below) and the Segmentation Algorithm in step 165.

The first order Markov chain assumption for the transition probabilities in autocoder can be replaced with a Kth-order Markov chain modeling assumption. Specifically, let the transition probability $p(C_i \mid C_{i-1}, C_{i-2}, C_{i-3}, \ldots, C_{i-K}, F)$ be the percentage of times that word-concept $C_i$ follows the word-concept sequence $C_{i-1}, C_{i-2}, C_{i-3}, \ldots, C_{1-K}$ given proposition F is being expressed.

Although a version of the Viterbi algorithm can be adapted for such cases, in general using the Viterbi algorithm in such cases to compute the "most probable" assignment of word-senses and propositions to word sequences is not mathematically tractable. Accordingly, statistical sampling methods can be used to find an asymptotically most probable assignment of word-senses and propositions to a word sequence. Specifically, the estimated probabilities are used to generate a random assignment of words to word-concepts and propositions to word-concept sequences where the likelihood of a particular assignment is determined by the estimated probabilities. This sampling algorithm process is repeated and the assignment with the highest sequence probability is kept. This sequence may then be deterministically perturbed so that every emission and transition probability is individually maximized. The sampling algorithm process for finding a "highly probable" semantic labeling which replaces Viterbi algorithm in a first-order autocoder system.

Research

In research studying the above-described method and system, a number of stories, based upon classic fables, each consisting of approximately 10–15 short sentences with each sentence corresponding to a proposition were created. Twenty-four human subjects read and recalled each of the four short texts. Half of the human recall data was coded by a human coder and used to estimate the parameters of the Hidden Markov Model associated with each proposition. The prior probability that a particular proposition was used by the human coder was also recorded Next, the Viterbi algorithm was used to assign the "most probable" proposition to human-coder specified text segments in the remaining half of the human recall data (the "test data"). Measures of agreement between the human coder and autocoder were then computed using only the test data.

Three human coders jointly coded the recall data from the training data set using the autocoder. The human coders were careful not to examine the test data, so the dictionaries created as a result of coding the training data were likely to not contain all concepts, propositions, and statistics necessary to code the test data set. Text segments in the test data were identified by the three human coders as well. The autocoder assigned the "most probable" proposition to each text segment using the information content score described in the previous section. The three human coders then coded the test data without the use of autocoder and measures of agreement between autocoder's performance and the human coder performance on the test data set were recorded.

Twenty-four college students read and verbally recited the above text from memory. The recall data was then transcribed. Text segments in all of the recalled protocol data corresponding to propositions were identified by human coders. The recall data from twelve of the college students was designated as training data, while the recall data from the remaining twelve college students was designated as test data.

To provide some insight into the richness and complexity of the statistical pattern recognition problem, an example of the recall protocol extracted from the training data set is illustrated as follows:

someone that a servant that knew that discovered the money# and took it# and then the miser saw that the money was gone# and he was upset# and complained to a neighbor# and the neighbor said well just get a stone and bury your money# dig a hole and bury the money# because it'll do you just as much good as your real money your gold is doing you#

The symbol # in the above recall protocol associated with subject 1 refers to the marking of text segments by an experienced human coder. Text segments corresponding to propositions were marked by experienced human coders for both the training and test data sets.

The following is a representative recall protocol from subject 12 who was assigned to the test data set. The complexity of the recall data (even when a human coder has already identified text segments) is readily apparent.

and he buried it in the ground # and he went over every day to look at where the money was where the lump of gold was buried# and one day when the miser wasn't there a thief came and dug up the lump of gold# and so the miser goes and he sees the hole in the ground# and he's very upset by that# and a bystander tells the miser to take a rock and bury it in the ground# and the miser says why# and the bystander says well all you ever did was look at the ground anyway# you never did use the gold# so there might as well be a rock there#

Results and Discussion

In order to compare performance of autocoder and the human coder on the test data set, three different measures of agreement were used. All measures were computed individually for each text across all relevant subject data. It is important to emphasize that autocoder always codes the same set of protocol data in exactly the same manner with 100% reliability. Thus, the agreement measures actually are measures of the validity as opposed to the reliability of autocoder's coding performance.

Agreement Measures

The first measure was percent agreement which is defined as the percentage of times the two coders agree that a proposition was mentioned in the recall protocol plus the percentage of times the two coders agree that a proposition was not mentioned. One difficulty with the percent agreement measure is that percent agreement can be artificially increased by simply increasing the number of propositions in the proposition dictionary. Accordingly, other agreement measures were considered.

The second measure of agreement was Cohen's Kappa score which essentially corrects for agreement by chance. The formula for Cohen's Kappa is given by: $\kappa=(p-p_c)/(1-p_c)$ where p is the percent agreement described in the previous paragraph and $p_c$ is the expected agreement between the two coders if the coding strategy of one coder provided no information (i.e., was statistically independent of the coding strategy of the other coder). The performance of the model for the percent agreement and kappa agreement measures on the training data set is provided in Table 1. The quantity N denotes the number of opportunities for agreement. Typically, in the text comprehension literature. Percent agreement scores for coding data which are above 90% and kappa scores which are above 70% are deemed acceptable for publication. The data was also analyzed using a third more stringent agreement measure we call sequential agreement. Sequential agreement is typically not computed. But since the same coder has identified the text segments in both the training and test data, the percentage of times both the human coder and autocoder agreed upon the coding of a particular text segment across recall protocols could be computed. This coding criterion thus takes into account the sequential structure of the recall data unlike the previously described agreement measures which are typically reported in the literature.

Analysis of Training Data

Table 1 shows the performance of autocoder on the training data set using standard agreement measures, while Table 2 shows the performance of autocoder using the sequential agreement measure. As can be seen from Tables 1 and 2, autocoder's performance clearly demonstrates that it is picking up on a sufficient number of statistical regularities from the skilled human coder's data to almost completely reconstruct the skilled human coder's decisions.

TABLE 1

Performance of Autocoder on Training Data (Standard Agreement Measures)

| Text | N | Percent Agreement | Cohen Kappa |
|---|---|---|---|
| "Miser" | 192 | 95% | 91% |
| "Cuckoo" | 336 | 93% | 84% |
| "Doctor" | 228 | 99% | 97% |
| "Eagle" | 384 | 97% | 93% |

TABLE 2

Performance of Autocoder on Training Data (Sequential Agreement Measures)

| Text | N | Percent Agreement |
|---|---|---|
| "Miser" | 111 | 90% |
| "Cuckoo" | 111 | 86% |
| "Doctor" | 105 | 98% |
| "Eagle" | 150 | 92% |

Analysis of Test Data

Tables 3 and 4 show the performance of autocoder on the test data set using the standard agreement measures and the sequential agreement measure. As can be seen from Tables 3 and 4, autocoder's performance is almost comparable to experienced human coders keeping in mind the limitation that the test data set was parsed into text segments corresponding to propositions by a human coder. On the other hand, the autocoder methodology has the important advantage that it is entirely well-documented and can be reliably implemented by computer software (unlike coding schemes implemented by human coders).

TABLE 3

Performance of Autocoder on Test Data (Standard Agreement Measures)

| Text | N | Percent Agreement | Cohen Kappa |
|---|---|---|---|
| "Miser" | 192 | 83% | 65% |
| "Cuckoo" | 336 | 88% | 71% |
| "Doctor" | 228 | 88% | 75% |
| "Eagle" | 384 | 84% | 66% |

TABLE 4

Performance of Autocoder on Test Data (Sequential Agreement Measures)

| Text | N | Percent Agreement |
|---|---|---|
| "Miser" | 111 | 69% |
| "Cuckoo" | 111 | 67% |
| "Doctor" | 105 | 76% |
| "Eagle" | 150 | 68% |

It is extremely encouraging (despite the simple texts considered in this initial study) that the performance of the autocoder algorithm was so effective on the test data. In almost all cases, autocoder automatically and reliably coded the data at an almost publishable agreement level using completely documented and accessible algorithms.

The methodology described above is only applicable to "segmented" data. That is, an experienced human coder is required to identify which segments in the text corresponded to the propositions to be identified on the test data set. In a further embodiment, the autocoder 15 is provided with free response data and must not only assign propositions to text segments but must decide (without human intervention) which text segments should be assigned to which propositions. This embodiment involves extracting the "meaning" of the currently processed clause and discarding most of the surface structure information.

Figure 6:
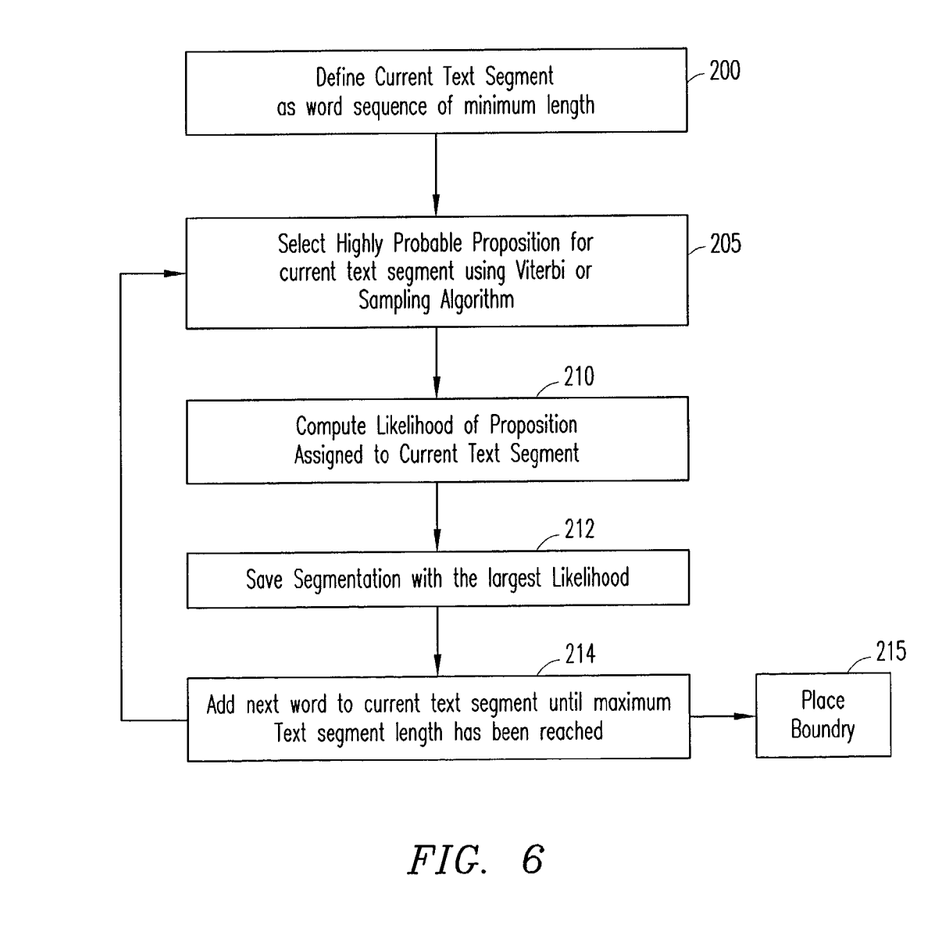
FIG. 6 is a flow diagram illustrating automatic segmentation of text data.

Specifically, as illustrated in FIG. 6, autocoder 15 defines at step 200 a current text segment (i.e., two words) as a word sequence of minimum length. At step 205, the most probable proposition for the current text segment is selected. The "likelihood" of each assignment is computed at step 210 and segments with a largest likelihood are saved at step 212. Additional words are added to the current text segment at step 214 subject to the constraint of a text segment of some fixed maximum length and returns to step 205. The autocoder 15 places a text segment boundary at the optimal segmentation point (i.e., has the largest likelihood) at step 215. Thus, autocoder's 15 behavior is analogous to a lazy human reader who reads one word at a time until a coherent proposition is identified, at that point a text segment boundary is created. The Training and Test Data Analyses for the Segmented Input Text Case in Table 5 and Table 6 differ slightly from those in Table 3 and Table 4 because Table 5 and Table 6 were generated using experiments with an enhanced version of autocoder 15.

TABLE 5

Training Data Analyses

| TEXT | SEGMENTED INPUT TEXT | | UNSEGMENTED INPUT TEXT | |
|---|---|---|---|---|
| | Agreement | Kappa | Agreement | Kappa |
| "Cuckoo" | 93% | 84% | 82% | 61% |
| "Doctor" | 100% | 99% | 93% | 86% |
| "Eagle" | 95% | 91% | 86% | 72% |
| "Miser" | 92% | 83% | 80% | 61% |
| "Czar" (Rumelhart) | 91% | 77% | 91% | 78% |

TABLE 6

Test Data Analyses

| TEXT | SEGMENTED INPUT TEXT | | UNSEGMENTED INPUT TEXT | |
|---|---|---|---|---|
| | Agreement | Kappa | Agreement | Kappa |
| "Cuckoo" | 85% | 63% | 81% | 55% |
| "Doctor" | 86% | 72% | 85% | 69% |
| "Eagle" | 85% | 66% | 81% | 57% |
| "Miser" | 82% | 63% | 80% | 60% |
| "Czar" (Rumelhart)(no test data; all data used for coding dictionaries) | | | | |

The above-described methods would find a number of applications in a variety of areas. One area of particular interest involves educational testing. Students, military personnel, employees and potential employees all are required to take various types of aptitude and qualification exams. Such exams are based upon multiple choice response data, and the techniques developed here would allow such exams to incorporate free language response data which would be automatically analyzed by a computer Other commercially related applications include improved interfaces to enable existing web browsers to interpret the meaning of user request, or to scan web articles to report relevant information to users.

Another application would involve the problems of automatic speech recognition. By incorporating knowledge of the types of ideas which the user is attempting to communicate into the analysis of acoustic speech signal, substantial speech recognition performance could be expected.

Finally, a further embodiment includes a "high-order" autocoder 15 system. Specifically, the autocoder 15 system previously described can be extended by allowing the probability distribution of a word-concept $C_i$ given the current proposition F to be functionally dependent not only upon the previous word-concept but also upon the past history of word concepts within the current proposition. That is, the original autocoder system is based upon a first-order Markov chain modeling assumption which states that the transition probability is given by the formula: $p(C_i|C_{i-1}, F)$ where $C_i$ is the word-concept which follows $C_{i-1}$ given proposition F. This process is more fully illustrated with respect to FIG. 7.

Figure 7:
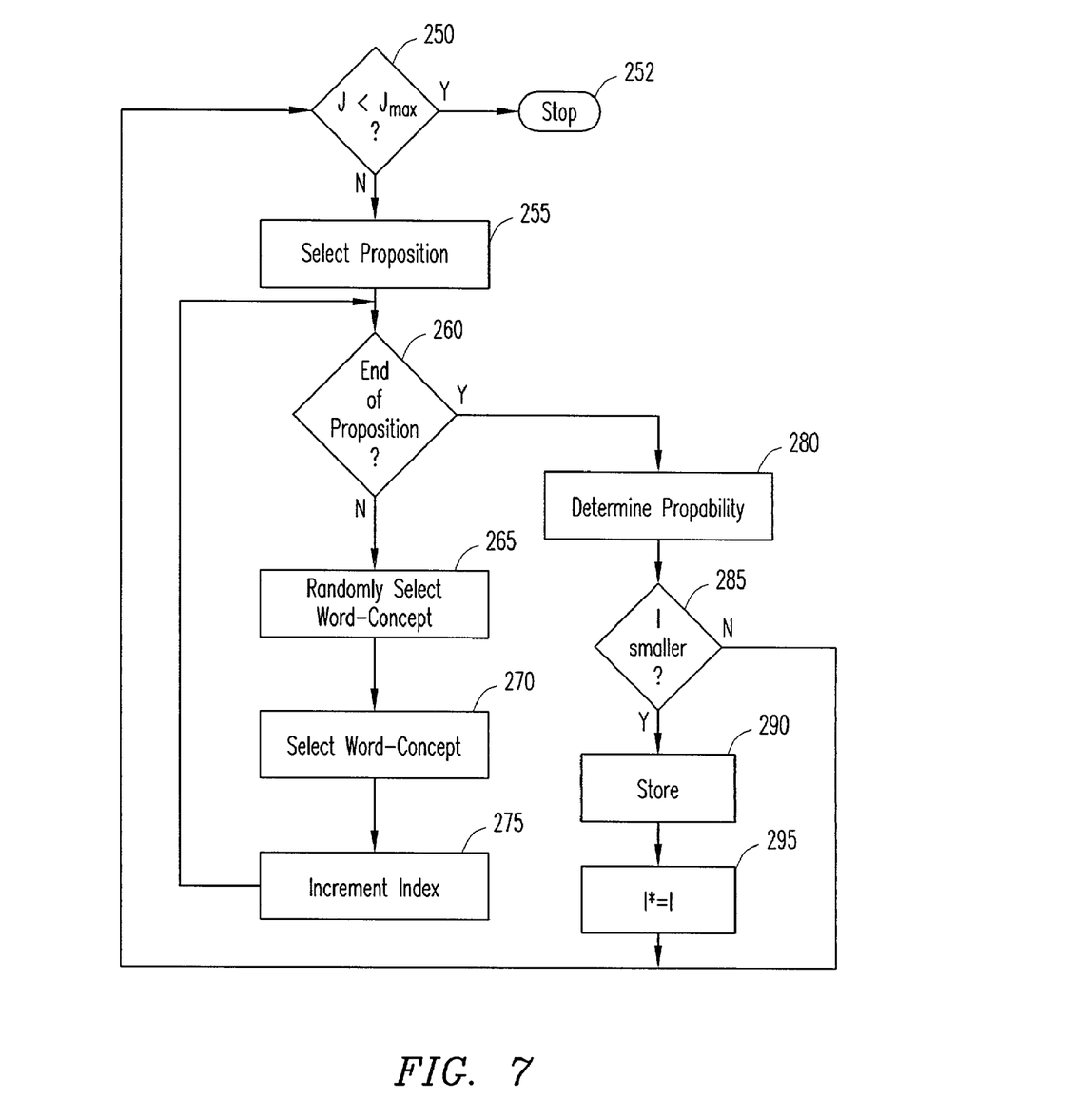
FIG. 7 is a flow diagram illustrating a Sampling Algorithm for coding text data.

The process of FIG. 7 operates according to a stochastic sampling phase. Assume that each Proposition $F_j$ is assigned a strictly positive probability $p_j$ of being selected. Inquiry step 250 determines if J exceeds $J_{max}$. If so, the process stops at step 252. If not, the jth proposition $F_j$ is selected at step 255 with probability $p_j$ wherein $I_i=1$ and I* is a large number. Inquiry step 260 determines if an end-of-proposition word-concept has been reached. If not, a word-concept $C_i$ with probability $p(C_i|C_{i-1}, C_{i-2}, C_{i-3}, \ldots, C_{1-K}, F_j)$ is randomly selected at step 265 given a previously chosen sequence of word concepts and proposition $F_j$ where $C_j$ is a vector zero when j is not a strictly positive integer. At step 270 a word concept $W_i$ is randomly selected given a word-sense concept $C_i$ with emission probability $p(W_i|C_i)$, and the index i (i.e., let i=i+1) is incremented at step 275 and the process returns to step 260.

If the end of proposition has been reached at step 280, the probability P of the assignment of word-concepts and propositions to the word-sequence is determined by computing the information content of the sequence $I=-\log_2 P$ where:

$$I = -(1/M)\log\left[p(F_J)\prod_{i=1}^{M} p(C_i | C_{i-1}, C_{i-2}, \ldots, C_{i-K}, F_J)p(W_i | C_i)\right]$$

where it is assumed that $C_j$ is a vector of zeros when j is not a strictly positive integer. If the current information content I is smaller than the best information content I* at inquiry step 285, the assigned sequence of word-sense concept labels $C_1, \ldots, C_M$, and proposition label $F_j$ associated with the current information content I as the current optimal semantic labeling is stored at step 290. Next, the new value of the information content I* is set equal to the current information content I at step 295 and control passes back to step 250. If I is not smaller, control passes back to step 250.

During the process of coding the second group of text data, the automatic segmentation algorithm looks in each group of words to determine automatically if that group of words should be subdivided further. It does this by trying different subsets of words within the current word group and computing a highly probable proposition for each subset of words. Only word subsets which meet the following criteria are considered. The word subsets must have at least a minimum number of words, a maximum number of word-concepts, an information content I below some threshold, and the word-concepts assigned to that word subset must satisfy certain user-specified syntactic constraints.

The previous description is of a preferred embodiment for implementing the invention, and the scope of the invention should not necessarily be limited by this description. The scope of the present invention is instead defined by the following claims.

What is claimed is:

1. A method for coding text data, comprising the steps of: generating a Hidden Markov Model which computes a probable coding responsive to a first group of text data;
    coding the first group of text data using a Viterbi algorithm using the Hidden Markov model;
    updating the Hidden Markov Model based upon the coding of the first group of text data;
    coding a second group of text data using the Viterbi algorithm using the updated Hidden Markov Model;
    wherein the step of coding the first group of text data comprises:
        assigning word concepts to groups of at least one word in the first group of text data;
        assigning propositions to groups of the assigned word concepts;
    wherein the steps of coding further comprises the step of determining a most probable proposition using the Viterbi algorithm;
    wherein the step of determining a most probable proposition further comprises the step of:
    determining a most probable set of word concepts for each set of words in a text segment and for a plurality of propositions using the Viterbi algorithm; and
    determining the most probable proposition for the plurality of propositions using the equation:

$$I = -(1/M)\log\left[p(F_J)\prod_{i=1}^{M} p(C_i \mid C_{i-1}, C_{i-2}, \ldots, C_{i-K}, F_J)p(W_i \mid C_i)\right]$$

where log [x] denotes the logarithm base 2;
    p(F)=percentage of time proposition F is used;
    $p(C_i|C_{i-1}, \ldots, C_{i-K}, F)$=percentage of time that word concept $C_i$ follows a previous sequence of word concepts, $C_{i-1}, \ldots, C_{i-K}$, given the proposition F;
    $p(W_i|C_i)$=percentage of time that a word ($W_i$) is used to express the word concept $C_i$; and
    K≧1.

2. The method of claim 1, wherein the step of correcting further comprises the step of updating using a human coder.

3. The method of claim 1, wherein the step of generating further includes the step of:
    generating a concept dictionary responsive to the assigned word concepts; and
    generating a proposition dictionary responsive to the assigned propositions.

4. The method of claim 1, further including the step of discarding propositions having the information content (I) exceeding a predetermined value.

5. The method of claim 1, further including the step segmenting the first group of text data prior to generating the Hidden Markov Model using a human coder.

6. The method of claim 1, further including the step of segmenting the second group of text data, comprising the steps of:
    determining a proposition likelihood for successive combinations of words; and
    placing a segment boundary after determination of a successive combination of words having a maximal proposition likelihood.

7. The method of claim 1, wherein the step of correcting the coding further comprises the step of correcting the coding using a graphical user interface.

8. The method of claim 1, wherein the step of generating further comprises the step of establishing a plurality of parameters for the Hidden Markov Model responsive to the coded first group of text data.

9. The method of claim 2, wherein the plurality of parameters includes at least one of a word concept dictionary, a proposition dictionary, a percentage of times that a particular proposition F is used, a percentage of times that a word Wi is used to express a word concept Ci, and a percentage of times that one word concept follows a previous plurality of word concepts Ci-1, . . . , Ci-K, when expressing the particular proposition F with K=1.

10. The method of claim 1, wherein the step of generating further comprises the steps of coding the first group of text data using a human coder.

11. The method of claim 10, wherein the step of coding the first group of the text data further includes the steps of constructing a word concept dictionary and a proposition dictionary.

12. The method of claim 10, wherein the step of coding further comprises the step of coding the first group of text data using a graphical user interface.

13. A method for coding text data, comprising the steps of:
    generating a Hidden Markov Model which computes a probable coding responsive to a first group of text data;
    coding the first group of text data using a Sampling Algorithm using the Hidden Markov model;
    updating the Hidden Markov Model based upon the coding of the first group of text data;
    coding a second group of text data using the Sampling Algorithm using the updated Hidden Markov Model;
    wherein the step of coding the first group of text data comprises:
        assigning concepts to groups of at least one word in the first group of text data;
        assigning propositions to groups of the assigned concepts;
    wherein the steps of coding further comprises the step of determining a probable proposition using the Sampling Algorithm;
    wherein the step of determining a most probable proposition further comprises the steps of:
        (a) selecting a proposition of a plurality of propositions;
        (b) determining if an end of the proposition has been reached;
        (c) if the end of the proposition has not been reached, randomly selecting a word concept with a unique probability determined by a proposition dictionary, a word-concept dictionary, a current word, a current proposition, estimated frequencies of the generated hidden Markov model, and a past sequence of word concepts and returning to step (b);
        (d) if the end of the proposition has been reached, computing information content (I) of the proposition:

(e) if all propositions have not been selected, selecting a next proposition of the plurality of propositions and returning to step (b); and (f) if all propositions have been selected, selecting the proposition with the smallest information content (I) of the plurality of propositions.

14. The method of claim 13, wherein the step of correcting further comprises the step of updating using a human coder.

15. The method of claim 13, wherein the step of generating further includes the step of:

generating a concept dictionary responsive to the assigned concepts; and generating a proposition dictionary responsive to the assigned propositions.

16. The method of claim 13, wherein the step of correcting the coding further comprises the step of correcting the coding using a graphical user interface.

17. The method of claim 13, wherein the step of generating further comprises the step of establishing a plurality of parameters for the Hidden Markov Model responsive to the coded first group of text data.

18. The method of claim 17, wherein the plurality of parameters includes at least one of a word-concept dictionary, a proposition dictionary, a percentage of times that a particular proposition F is used, a percentage of times that a word Wi is used to express the word-concept Ci, and a percentage of times that one word-concept Ci follows a previous plurality of word concepts Ci−1, . . . , Ci−K when expressing the particular proposition F.

19. The method of claim 13, wherein the step of selecting the proposition with the smallest information content (I) further comprises the step of:

determining the proposition with the smallest information content (I) for the plurality of propositions using the equation:

$$I = -(1/M)\log\left[p(F_J)\prod_{i=1}^{M} p(C_i \mid C_{i-1}, C_{i-2}, \ldots, C_{i-K}, F_J)p(W_i \mid C_i)\right]$$

where log [x] denotes the logarithm base 2;

p(F)=percentage of time proposition F is used;

p(Ci|Ci−1, . . . , C i−K, F)=percentage of time that word concept Ci follows a previous sequence of word concepts, Ci−1, . . . , Ci−K, given the proposition F; and p(Wi|Ci)=percentage of time that a word (Wi) is used to express the word concept Ci; and K≧1.

20. The method of claim 19, further including the step of discarding propositions having an information content (I) exceeding a predetermined value.

21. The method of claim 13, wherein the step of generating further comprises the steps of coding the first group of text data using a human coder.

22. The method of claim 21, wherein the step of coding further includes the steps of constructing a word concept dictionary and a proposition dictionary.

23. The method of claim 21, wherein the step of coding further comprises the step of coding the first group of text data using a graphical user interface.

24. An autocoder for coding text data, the autocoder comprising:

a graphical user interface enabling a human coder to code a first group of text data;

a control logic for:

generating a Hidden Markov Model responsive to the coded first group of data;

coding a second group of text data using an algorithm responsive to the generated Hidden Markov Model;

updating the Hidden Markov Model based on corrections to the coding of the second group of text data;

wherein the graphical user interface further comprises:

a concept menu for assigning word-concepts to groups of at least one word in the first group of text data;

a proposition menu for assigning propositions to groups of the assigned word-concepts;

wherein the control logic further determines a probable proposition using the algorithm;

wherein the algorithm comprises a Sampling Algorithm;

wherein the control logic determines a most probable proposition by:

(a) selecting a proposition of a plurality of propositions;

(b) determining if an end of the proposition has been reached;

(c) if the end of the proposition has not been reached, randomly selecting a word concept with a unique probability determined by a proposition dictionary, a word-concept dictionary, a current word, a current proposition, estimated frequencies of the generated hidden Markov model, and a past sequence of word concepts and returning to step (b);

(d) if the end of the proposition has been reached, computing information content (I) of the proposition;

(e) if all proposition have not been selected, selecting a next proposition of the plurality of propositions and returning to step (b); and (f) if all propositions have been selected, selecting the proposition with the smallest information content (I) of the plurality of propositions.

25. The autocoder of claim 24, wherein the control logic further:

generates a concept dictionary responsive to the assigned concepts; and generates a proposition dictionary responsive to the assigned propositions.

26. The autocoder of claim 24, wherein the control logic further segments the second group of text data by:

determining a proposition likelihood for successive combinations of words; and placing a segment boundary after determination of a successive combination of words having a maximal proposition likelihood.

27. The autocoder of claim 24, wherein the control logic establishes a plurality of parameters for the Hidden Markov Model responsive to the coding of the first group of text data.

28. The autocoder of claim 27, wherein the plurality of parameters includes at least one of a word-concept dictionary, a proposition dictionary, a percentage of times that a particular proposition F is used, a percentage of times that a word Wi is used to express the word-concept Ci, and a percentage of times that one word-concept Ci follows a previous plurality of word concepts Ci−1, . . . , Ci−K when expressing the particular proposition F.

29. The autocoder of claim 24, wherein the control logic determines the information content (I) by the equation:

$$I = -(1/M)\log\left[p(F_J)\prod_{i=1}^{M} p(C_i \mid C_{i-1}, C_{i-2}, \ldots, C_{i-K}, F_J)p(W_i \mid C_i)\right]$$

where log [x] denotes the logarithm base 2;
p(F)=percentage of time proposition F is used;
p($C_i$|$C_{i-1}$, ..., $C_{i-K}$, F)=percentage of time that word concept $C_i$ follows a previous sequence of word concepts, $C_{i-1}$, ..., $C_{i-K}$, given the proposition F; and
p($W_i$|$C_i$)=percentage of time that a word ($W_i$) is used to express the word concept $C_i$; and
K≧1.

30. The autocoder of claim 29, wherein the control logic discards propositions having the information content (I) exceeding a predetermined value.

31. The autocoder of claim 24, wherein the algorithm comprises a Viterbi Algorithm.

32. The autocoder of claim 31, wherein the control logic determines a probable proposition by:
determining a most probable set of word concepts for each word set in a text segment and for each of a plurality of propositions; and
determining the most probable proposition for the plurality of propositions using the equation:

$$I = -(1/M)\log\left[p(F_J)\prod_{i=1}^{M} p(C_i \mid C_{i-1}, C_{i-2}, \ldots, C_{i-K}, F_J)p(W_i \mid C_i)\right]$$

where log [x] denotes the logarithm base 2;
p(F)=percentage of time proposition F is used;
p($C_i$|$C_{i-1}$, ..., $C_{-i-K}$, F)=percentage of time that word concept $C_i$ follows a previous sequence of word concepts, $C_{i-1}$, ..., $C_{i-K}$, given the proposition F;
p($W_i$|$C_i$)=percentage of time that a word ($W_i$) is used to express the word concept $C_i$; and
K=1.

33. The autocoder of claim 32, wherein the control logic further discards propositions having the information content (I) exceeding a predetermined value.

34. An article of manufacture for coding text data, comprising:
processor readable storage medium;
processor programming stored on said storage medium, wherein said processor programming is configured to be readable from said processor readable storage medium by a processor and thereby causing said processor to operate so as to:
generate a Hidden Markov Model which computes a probable coding responsive to a first group of text data which is iteratively refined through interaction with a human coder via a graphical user interface;
code the first group of text data using a Viterbi algorithm using the Hidden Markov model;
update the Hidden Markov Model based upon the coding of the first group of text data;
code a second group of text data using an algorithm using the updated Hidden Markov Model;
wherein the processor programming is further configured to display a graphical user interface, the graphical user interface comprising:
a concept menu for assigning word-concepts to groups of at least one word in the first group of text data;
a proposition menu for assigning propositions to groups of the assigned word-concepts;
wherein the algorithm comprises a Sampling Algorithm:
wherein the processor programming is further configured to determine a most probable proposition by:
(a) selecting a proposition of a plurality of propositions;
(b) determining if an end of the proposition has been reached;
(c) if the end of the proposition has not been reached, randomly selecting a word concept with a unique probability determined by a proposition dictionary, a word-concept dictionary, a current word, a current proposition, estimated frequencies of the generated hidden Markov model, and a past sequence of word concepts and returning to step (b);
(d) if the end of the proposition has been reached, computing information content (I) of the proposition;
(e) if all propositions have not been selected, selecting a next proposition of the plurality of propositions and returning to step (b); and
(f) if all propositions have been selected, selecting the most probable proposition of the plurality of propositions.

35. The article of manufacture of claim 34, wherein the processor programming is further configured to:
generate a concept dictionary responsive to the assigned concepts; and
generate a proposition dictionary responsive to the assigned propositions.

36. The article of manufacture of claim 34, wherein the processor programming is further configured to update the Hidden Markov Model based on corrections by a human coder.

37. The article of manufacture of claim 34, wherein the processor programming is further configured to segment the first group of text data prior to generating the Hidden Markov Model.

38. The article of manufacture of claim 34, wherein the processor programming is further configured to segment the second group of text data by:
determining a proposition likelihood for successive combinations of words; and
placing a segment boundary after determination of a successive combination of words leaving a maximal proposition likelihood.

39. The article of manufacture of claim 34, wherein the processor programming is further configured to establish a plurality of parameters for the Hidden Markov Model.

40. The article of manufacture of claim 39, wherein the plurality of parameters includes at least one of a word-concept dictionary, a proposition dictionary, a percentage of times that a particular proposition F is used, a percentage of times that a word $W_i$ is used to express the word-concept $C_i$, and a percentage of times that one word-concept $C_i$ follows a previous plurality of word concepts $C_{i-1}$, ..., $C_{i-K}$ when expressing the particular proposition F.

41. The article of manufacture of claim 34, wherein the processor programming determines a probability by:
determining the most probable proposition with the smallest information content (I) for the plurality of propositions using the equation:

$$I = -(1/M)\log\left[p(F_J)\prod_{i=1}^{M} p(C_i | C_{i-1}, C_{i-2}, \ldots, C_{i-K}, F_J)p(W_i | C_i)\right]$$

where log [x] denotes the logarithm base 2;
p(F)=percentage of time proposition F is used;
p(Ci|Ci−1, . . . , Ci−K, F)=percentage of time that word concept Ci follows a previous sequence of word concepts, Ci−1, . . . , Ci−K, given the proposition F; and
p(Wi|Ci)=percentage of time that a word (Wi) is used to express the word concept Ci; and
K≧1.

42. The article of manufacture of claim 41, wherein the processor programming is further configured to discard propositions having the information content (I) exceeding a predetermined value.

43. The article of manufacture of claim 34, wherein the processor programming is further configured to determine a most probable proposition using the algorithm.

44. The article of manufacture of claim 43, wherein the algorithm comprises a Viterbi Algorithm.

45. The article of manufacture of claim 44 wherein the processor programming is further configured to determine a most probable proposition by:

determining a most probable set of word concepts for each set of words in a text segment and for a plurality of propositions using the Viterbi algorithm; and
determining the most probable proposition for the plurality of propositions using the equation:

$$I = -(1/M)\log\left[p(F_J)\prod_{i=1}^{M} p(C_i | C_{i-1}, C_{i-2}, \ldots, C_{i-K}, F_J)p(W_i | C_i)\right]$$

where log [x] denotes the logarithm base 2;
p(F)=percentage of time proposition F is used;
p(Ci|Ci−1, . . . , Ci−K, F)=percentage of time that word concept Ci follows a previous sequence of word concepts, Ci−1, . . . , Ci−K, given the proposition F; and
p(Wi|Ci)=percentage of time that a word (Wi) is used to express the word concept Ci; and
K=1.

46. The article of manufacture of claim 45, wherein the processor programming is further configured to discard propositions having the information content exceeding a predetermined value.

* * * * *